United States Patent
Ebeshu et al.

[11] Patent Number: 6,167,493
[45] Date of Patent: *Dec. 26, 2000

[54] SEMICONDUCTOR APPARATUS AND READ ACCESS METHOD

[75] Inventors: Hidetaka Ebeshu; Hirotoshi Okada; Hideaki Tomatsuri, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/863,025

[22] Filed: May 23, 1997

[30] Foreign Application Priority Data

Dec. 5, 1996 [JP] Japan ................................ 8-324473

[51] Int. Cl.$^7$ ........................................................ G06F 13/18
[52] U.S. Cl. ................................. 711/158; 711/5; 712/38
[58] Field of Search ............................... 711/158, 163, 711/151, 167, 170, 5, 129; 395/303, 800.38, 800.39, 296, 288, 298, 732, 860; 710/123, 116, 108, 118, 244, 40, 131–132

[56] References Cited

U.S. PATENT DOCUMENTS

| | | | |
|---|---|---|---|
| 3,896,419 | 7/1975 | Lange et al. | 711/129 |
| 3,979,726 | 9/1976 | Lange et al. | 711/135 |
| 4,323,968 | 4/1982 | Capozzi | 714/52 |
| 4,402,041 | 8/1983 | Clark | 711/158 |
| 4,870,562 | 9/1989 | Kimoto et al. | 711/167 |
| 4,958,276 | 9/1990 | Kiuchi et al. | 711/167 |
| 5,168,559 | 12/1992 | Tamura | 711/167 |
| 5,247,621 | 9/1993 | Gulick | 395/281 |
| 5,325,508 | 6/1994 | Parks et al. | 711/118 |
| 5,355,466 | 10/1994 | Iwamoto | 395/288 |
| 5,371,869 | 12/1994 | Lee | 395/559 |
| 5,426,759 | 6/1995 | Padgaonkar | 711/1 |
| 5,566,309 | 10/1996 | Tamura | 711/5 |
| 5,577,230 | 11/1996 | Argade et al. | 395/303 |
| 5,644,756 | 7/1997 | Harwood, III | 395/311 |
| 5,813,043 | 9/1998 | Hes et al. | 711/163 |

*Primary Examiner*—Eddie P. Chan
*Assistant Examiner*—Yamir Encarnacion
*Attorney, Agent, or Firm*—Staas & Halsey LLP

[57] ABSTRACT

A CPU performs read access to a plurality of resources. A plurality of buffers connect the plurality of resources to the CPU, respectively. The CPU causes one of the plurality of buffers connected to one of the plurality of resources to be in an active state so that the CPU can perform read access to the one of the plurality of resources via the one of the plurality of buffers, the one of the plurality of resources being given priority.

8 Claims, 3 Drawing Sheets

SEMICONDUCTOR APPARATUS AND READ ACCESS METHOD

BACKGROUND OF THE INVENTION

1. Field of the Invention

The present invention relates to a semiconductor apparatus having a CPU and an internal resource and having an external resource connected thereto. The present invention also relates to a read access method, in such a semiconductor apparatus, for a CPU to an internal resource and an external resource.

2. Description of Related Art

Figure 1:
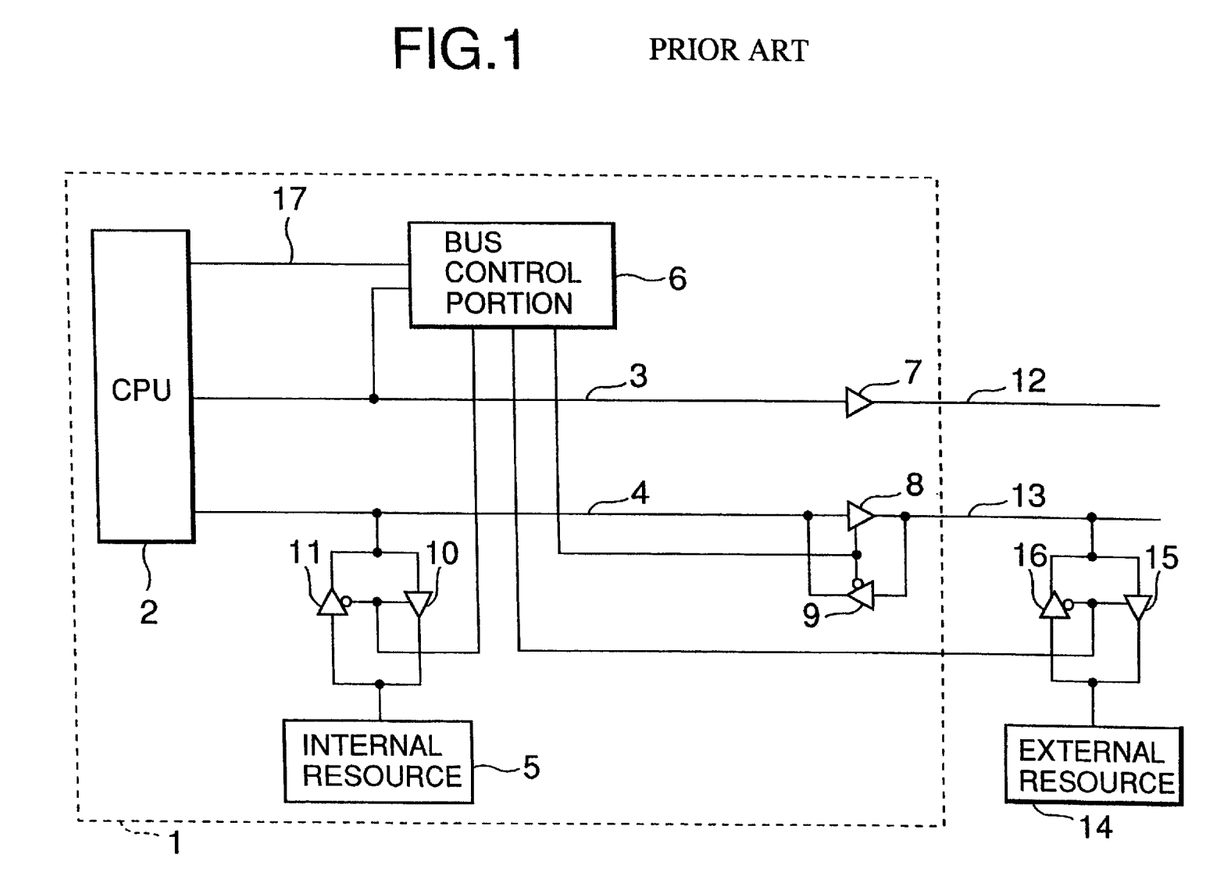
FIG. 1 shows an essential portion of an example of an information processing system in the related art.

FIG. 1 shows a circuit diagram of an essential portion of an example of an information processing system in the related art. A semiconductor apparatus 1 includes a CPU 2. An internal address bus 3 acts as an internal address transfer path. An internal data bus 4 acts as an internal data transfer path.

The CPU 2 accesses an internal resource 5. A bus control portion 6 controls use of the internal data bus 4. A buffer 7 is provided for an external address bus 12.

Three-state buffers 8 and 9 are provided for an external data bus 13. Three-state buffers 10 and 11 are provided between the internal data bus 4 and the internal resource 5.

The external address bus 12 acts as an external address transfer path. The external data bus 13 acts as an external data transfer path. The CPU also accesses an external resource 14. Three-state buffers 15 and 16 are provided between the external data bus 13 and the external resource 14.

The CPU 2 outputs a read/write control signal via a read/write control signal line 17. The read/write control signal determines whether each of the three-state buffers 8, 9, 10, 11, 15 and 16 is in an active state or a inactive state.

In this information processing system, when the CPU 2 performs a read access to the internal resource or the external resource, an address is supplied from the CPU 2 to the internal address bus 3. This address is decoded by the bus control portion 6. Thereby, when a read access is indicated by the read/write control signal which is input to the read/write control line 17 from the CPU 2, whether the CPU 2 performs the read access to the internal resource 5 or the external resource 14 is determined.

When it is determined that the CPU 2 performs read access to the internal resource 5, by the bus control portion 6, three-state buffers 9 and 16 are controlled to be in the inactive state and the output ends of the three-state buffers 9 and 16 have high impedances. Further, the three-state buffer 11 is controlled to be in the active state and the CPU 2 receives data from the internal resource 5.

When it is determined that the CPU 2 performs read access to the external resource 14, by the bus control portion 6, the three-state buffer 11 is controlled to be in the inactive state and the output end of the three-state buffer 11 has a high impedance. Further, the three-state buffers 9 and 16 are controlled to be in the active state and the CPU 6 receives data from the external resource 14.

Thus, in the semiconductor apparatus 1, when the CPU 2 performs read access to the internal resource 5 or the external resource 14, the bus control portion 6 decodes the address input to the internal address bus 3 from the CPU 2. Then, based on the decoded result, the internal resource 5 is connected to the internal data bus 4 via the three-state buffer 11, or the external resource 14 is connected to the internal bus 4 via the three-state buffer 16, external data bus 13 and three-state buffer 9. Thereby, it is not possible to perform a high-speed read access by the CPU 2 to the internal resource 5 or the external resource 14. Further, until the address is decoded, the three-state buffers 9 and 11 are in the active state and are in the inactive state. Accordingly, power consumption is large.

SUMMARY OF THE INVENTION

The present invention has been devised in consideration of these problems. An object of the present invention is to provide a semiconductor apparatus and a read access method in which high-speed and low-power-consumption read access to an internal resource or an external resource by a CPU can be achieved, and, when the semiconductor apparatus is used, high-speed and low-power-consumption operation of an information processing system can be achieved.

A first aspect of the present invention comprises:

a CPU;

a plurality of resources to which the CPU performs read access; and a plurality of buffers connecting the plurality of resources to the CPU, respectively, wherein the CPU controls one of the plurality of buffers connected to one of the plurality of resources to be in an active state so that the CPU can perform read access to the one of the plurality of resources via the one of the plurality of buffers, the one of the plurality of resources being given priority.

A second aspect of the present invention comprises:

a CPU;

an internal resource;

first data transfer control means which is provided in a data transfer path between the CPU and the internal resource and controls data transfer from the internal resource to the CPU; and second data transfer control means which is provided in a data transfer path between the CPU and an external resource and controls data transfer from the external resource to the CPU, wherein:

in a case where a setting is made so that read access to the internal resource is given priority over read access to the external resource, when performing read access, the CPU controls the first and second data transfer control means so that the first data transfer control means is in an active state and the second data transfer control means is in an inactive state, and, if the read access is not to the internal resource, the CPU controls the first and second data transfer control means so that, in a subsequent operation cycle, the first data transfer control means is in the inactive state and the second data transfer control means is in the active state; and in a case where a setting is made so that read access to the external resource is given priority over read access to the internal resource, when performing read access, the CPU controls the first and second data transfer control means so that the first data transfer control means is in the inactive state and the second data transfer control means is in the active state, and, if the read access is to the internal resource, the CPU controls the first and second data transfer control means so that, in a subsequent operation cycle, the first data transfer control means is in the active state and the second data transfer control means is in the inactive or inactive state.

In the second aspect of the present invention, in the case where the setting is made so that read access to the internal resource is given priority over read access to the external resource, when performing read access, the CPU controls the first and second data transfer control means so that the first data transfer control means is in the active state and the second data transfer control means is in the inactive state.

As a result, when the read access is performed, the data transfer path between the internal resource and the CPU is conductive whereas the data transfer path between the external resource and the CPU is non-conductive. Accordingly, in a case where the read access is to the internal resource, the read access to the internal resource by the CPU can be performed at high speed.

In the case where the setting is made so that read access to the external resource is given priority over read access to the internal resource, when performing read access, the CPU controls the first and second data transfer control means so that the first data transfer control means is in the inactive state and the second data transfer control means is in the active state.

As a result, when the read access is performed, the data transfer path between the internal resource and the CPU is non-conductive whereas the data transfer path between the external resource and the CPU is conductive. Accordingly, in a case where the read access is to the external resource, the read access to the external resource by the CPU can be performed at high speed.

Thus, according to the second aspect of the present invention, in the case where the setting is made so that read access to the internal resource is given priority over read access to the external resource, the read access to the internal resource by the CPU can be performed at high speed. In the case where the setting is made so that read access to the external resource is given priority over read access to the internal resource, the read access to the external resource by the CPU can be performed at high speed.

Further, according to the second aspect of the present invention, because the CPU previously knows whether access is made to the external resource or to the internal resource, the number of bus switching operations can be reduced. Thereby, low-power-consumption operation/processing of the information processing system can be achieved.

A third aspect of the present invention, according to the second aspect of the present invention, further comprises a response signal generating circuit which determines whether or not an address output from the CPU indicates the internal resource, and supplies a response signal to the CPU, the response signal indicating whether or not the address output from the CPU indicates the internal resource, so that the CPU, based on the response signal, can know whether or not read access is to the internal resource.

In a fourth aspect of the present invention, according to the second aspect of the present invention, the setting of whether read access to the internal resource is given priority over read access to the external resource or read access to the external resource is given priority over read access to the internal resource is made directly to the CPU via an external terminal.

In a fifth aspect of the present invention, according to the second aspect of the present invention, the setting of whether read access to the internal resource is given priority over read access to the external resource or read access to the external resource is given priority over read access to the internal resource is made through a register to the CPU.

A sixth aspect of the present invention is a method of read access to a plurality of resources by a CPU, a plurality of buffers connects the plurality of resources to the CPU, respectively, comprising the step of controlling one of the plurality of buffers connected to one of the plurality of resources to be in an active state so that the CPU can perform read access to the one of the plurality of resources via the one of the plurality of the buffers, the one of the plurality of buffers being given priority.

A seventh aspect of the present invention is a method of providing read access to an internal resource and an external resource by a CPU in a semiconductor apparatus which includes the CPU and the internal resource and has the external resource connected thereto, comprising the steps of:

a) in a case where read access to the internal resource is given priority over read access to the external resource, when read access is performed by the CPU, causing a data transfer path between the internal resource and the CPU to be conductive and a data transfer path between the external resource and the CPU to be non-conductive, and, if the read access by the CPU is not to the internal resource, causing the data transfer path between the internal resource and the CPU to be non-conductive and the data transfer path between the external resource and the CPU to be conductive in a subsequent operation cycle; and b) in a case where read access to the external resource is given priority over read access to the internal resource, when read access is performed by the CPU, causing the data transfer path between the internal resource and the CPU to be non-conductive and the data transfer path between the external resource and the CPU to be conductive, and, if the read access by the CPU is to the internal resource, causing the data transfer path between the internal resource and the CPU to be conductive and the data transfer path between the external resource and the CPU to be non-conductive in a subsequent operation cycle.

According to the seventh aspect of the present invention, in the case where read access to the internal resource is given priority over read access to the external resource, when the CPU performs read access, the data transfer path between the internal resource and the CPU is caused to be conductive and the data transfer path between the external resource and the CPU is caused to be non-conductive. Thereby, in a case where the read access by the CPU is to the internal resource, high-speed read access to the internal resource can be achieved by the CPU.

In the case where read access to the external resource is given priority over read access to the internal resource, when the CPU performs read access, the data transfer path between the internal resource and the CPU is caused to be non-conductive and the data transfer path between the external resource and the CPU is caused to be conductive. Thereby, in a case where the read access by the CPU is to the external resource, high-speed read access to the external resource can be achieved by the CPU.

Thus, according to the seventh aspect of the present invention, in the case where the setting is made so that read access to the internal resource is given priority over read access to the external resource, high-speed read access to the internal resource can be achieved by the CPU. In the case where the setting is made so that read access to the external resource is given priority over read access to the internal resource, high-speed read access to the external resource can be achieved by the CPU.

Further, according to the seventh aspect of the present invention, because the CPU previously knows whether access is made to the external resource or to the internal resource, the number of bus switching operations can be reduced. Thereby, low-power-consumption operation/processing of the information processing system can be achieved.

Other objects and further features of the present invention will become more apparent from the following detailed description when read in conjunction with the accompanying drawings.

DETAILED DESCRIPTION OF THE EMBODIMENT

Figure 2:
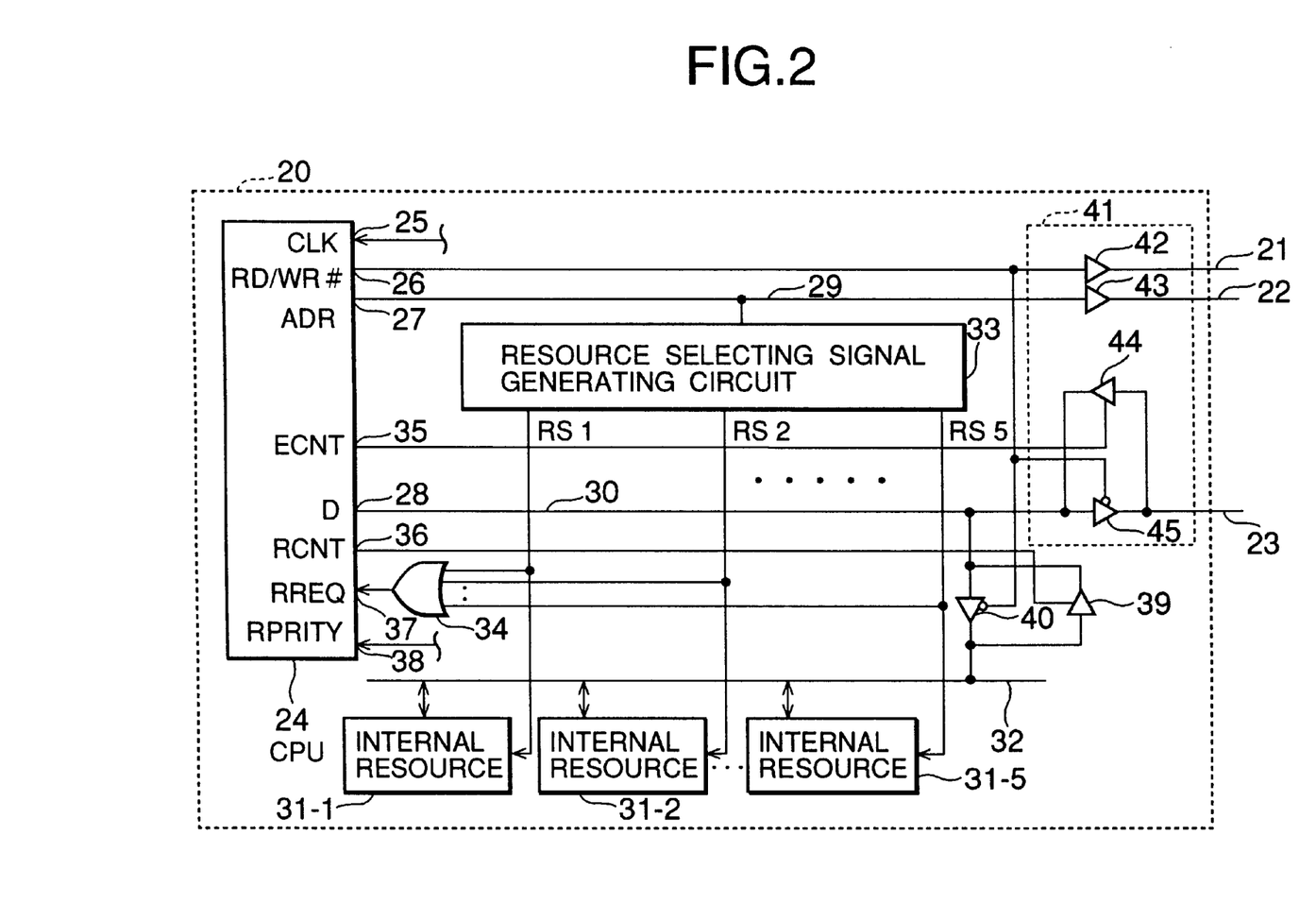
FIG. 2 shows a circuit diagram of a semiconductor apparatus in an embodiment of the present invention together with an external read/write control signal line, an external address bus and an external data bus.

FIG. 2 shows a circuit diagram of a semiconductor apparatus 20 in an embodiment of the present invention together with an external read/write control signal line 21, an external address bus 22 and an external data bus 23. In the semiconductor apparatus 20, a read access method in an embodiment of the present invention is performed.

The semiconductor apparatus 20 includes a CPU 24. Clock pulses CLK are input to a clock pulse input terminal 25. From a read/write control signal output terminal 26, a read/write control signal RD/WR# is output. The read/write control signal RD/WR# indicates whether read access is performed or write access is performed.

The read/write control signal RD/WR# is at a high logic level (referred to as "H", hereinafter) when the CPU 24 performs the read access. The read/write control signal RD/WR# is at a low logic level (referred to as "L", hereinafter) when the CPU 24 performs the write access.

From an address output terminal 27, the address ADR of a destination which the CPU 24 accesses is output. To and from a data input/output terminal 28, data D is input and output.

An internal address bus 29 is connected to the address output terminal 27 of the CPU 24. An internal data bus 30 is connected to the data input/output terminal 28 of the CPU 24. The CPU 24 accesses internal resources 31-1, 31-2 and 31-5. A showing of the internal resources 31-3 an 31-4 is omitted in the figure.

A resource bus 32 acts as a data transfer path and is commonly used by the internal resources 31-1, 31-2, . . . , 31-5. A resource selecting signal generating circuit 33 decodes the address ADR input to the internal address bus 29 from the CPU 24, and generates resource selecting signals RS1, RS2, . . . , RS5 which select one of the internal resources 31-1, 31-2, . . . , 31-5.

When not selecting one of the resources 31-1, 31-2, . . . , 31-5, the resource selecting signal generating circuit 33 causes or controls each of the resource selecting signals RS1, RS2, . . . , RS5 to be at "L". When selecting one of the internal resources, the resource selecting signal generating circuit 33 causes or controls the resource selecting signal for the internal resource to be selected to be at "H".

An OR circuit 34 performs an OR operation on the resource selecting signals RS1, RS2, . . . , RS5 output by the resource selecting signal generating circuit 33. The OR circuit 34 outputs a response signal RREQ which indicates whether or not the address input to the internal address bus 29 from the CPU 24 indicates any of the internal resources 31-1, 31-2, . . . , 31-5. The resource selecting signal generating circuit 33 and OR circuit 34 form a response signal generating circuit.

When the address input to the internal address bus 29 from the CPU 24 indicates any of the internal resources 31-1, 31-2, . . . , 31-5, the response signal RREQ is at "H". When the address input to the internal address bus 29 from the CPU 24 indicates none of the internal resources 31-1, 31-2, . . . , 31-5, the response signal RREQ is at "L".

From an external data transfer control signal output terminal 35 of the CPU 24, an external data transfer control signal ECNT is output. The external data transfer control signal ECNT controls transfer of the data on the external data bus 23 to the internal data bus 30.

From an internal data transfer control signal output terminal 36, an internal data transfer control signal RCNT is output. The internal data transfer control signal RCNT controls transfer of the data on the resource bus 32 to the internal data bus 30. The response signal RREQ output from the OR circuit 34 is inputted to a response signal input terminal 37.

A resource priority specifying signal RPRITY is input to a resource priority specifying signal input terminal 38. The resource priority specifying signal specifies whether transfer of the data on the resource bus 32 to the internal data bus 30 is given priority or transfer of the data on the external data bus 23 to the internal data bus 30 is given priority, that is, whether read access by the CPU 24 to the internal resources 31-1, 31-2, . . . , 31-5 is given priority or read access by the CPU 24 to external resources is given priority.

The resource priority specifying signal RPRITY is at "H" when transfer of the data on the resource bus 32 to the internal data bus 30 is given priority, that is, when read access by the CPU 24 to the internal resources 31-1, 31-2, . . . , 31-5 is given priority. The resource priority specifying signal RPRITY is at "L" when transfer of the data on the external data bus 23 to the internal data bus 30 is given priority, that is, when read access by the CPU 24 to external resources is given priority.

A three-state buffer 39 is connected between the resource bus 32 and the internal data bus 30. Whether the three-state buffer 39 is in the active state or in the inactive state is controlled by the internal data transfer control signal RCNT. The three-state buffer 39 controls transfer of the data on the resource bus 32 to the internal data bus 30.

The three-state buffer 39 is in the active state when the internal data transfer control signal RCNT="H", and the data on the resource bus 32 is transferred to the internal data bus 30. The three-state buffer 39 is in the inactive state when the internal data transfer control signal RCNT="L", and the output end of the three-state buffer 39 has a high impedance.

A three-state buffer 40 is connected between the internal data bus 30 and the resource bus 32. Whether the three-state buffer 40 is in the active state or in the inactive state is controlled by the read/write control signal RD/WR#. The three-state buffer 40 controls transfer of the data on the internal data bus 30 to the resource bus 32.

When the read/write control signal RD/WR#="L", that is, when the CPU 24 performs the write access, the three-state buffer 40 is in the active state. The data on the internal data bus 30 is transferred to the resource bus 32. When the read/write control signal RD/WR#="H", that is, when the CPU 24 performs the read access, the three-state buffer 40 is in the inactive state, and the output end of the three-state buffer 40 has a high impedance.

An I/O circuit includes a buffer 42 which is provided for the external read/write control signal line 21 and a buffer 43 which is provided for the external address bus 22.

A three-state buffer 44 is connected between the external data bus 23 and the internal data bus 30. Whether the three-state buffer 44 is in the active state or in the inactive state is controlled by the external data transfer control signal ECNT. The three-state buffer 44 controls transfer of the data on the external data bus 23 to the internal data bus 30.

The three-state buffer 44 is in the active state when the external data transfer control signal ECNT="H", and the data on the external data bus 23 is transferred to the internal data bus 30. When the external data transfer control signal ECNT="L", the three-state buffer 44 is in the inactive state and the output end of the three-state buffer 44 has a high impedance.

A three-state buffer 45 is connected between the internal data bus 30 and the external data bus 23. Whether the three-state buffer 45 is in the active state or in the inactive state is controlled by the read/write control signal RD/WR#. The three-state buffer 45 controls transfer of the data on the internal data bus 30 to the external data bus 23.

When the read/write control signal RD/WR#="L", that is, when the CPU 24 performs the write access, the three-state buffer 45 is in the active state, and the data on the internal data bus 30 is transferred to the external data bus 23. When the read/write control signal RD/WR#="H", that is, when the CPU 24 performs the read access, the three-state buffer 45 is in the inactive state and the output end of the three-state buffer 45 has a high impedance.

When the resource priority specifying signal RPRITY="H", during the read access, the CPU 24 operates so that the external data transfer control signal ECNT="L" and the internal data transfer control signal RCNT="H".

When the resource priority specifying signal RPRITY="H", the external data transfer control signal ECNT="L" and the internal data transfer control signal RCNT="H", when the response signal RREQ="H", and the CPU 24 operates so as to maintain the state where the external data transfer control signal ECNT="L" and the internal data transfer control signal RCNT="H".

When the resource priority specifying signal RPRITY="H", the external data transfer control signal ECNT="L" and the internal data transfer control signal RCNT="H", and when the response signal RREQ is not at "H", the CPU 24 operates so that, in the subsequent clock cycle, the level of the external data transfer control signal ECNT is changed from "L" to "H" and the level of the internal data transfer control signal RCNT is changed from "H" to "L".

When the resource priority specifying signal RPRITY="L", during the read access, the CPU 24 operates so that the external data transfer control signal ECNT="H" and the internal data transfer control signal RCNT="L".

In the condition where the resource priority specifying signal RPRITY="L", the external data transfer control signal ECNT="H" and the internal data transfer control signal RCNT="L", when the response signal RREQ is not at "H", the CPU 24 operates so that the state where the external data transfer control signal ECNT="H" and the internal data transfer control signal RCNT="L" is maintained.

In the condition where the resource priority specifying signal RPRITY="L", the external data transfer control signal ECNT="H" and the internal data transfer control signal RCNT="L", when the response signal RREQ="H", the CPU 24 operates so that, in the subsequent clock cycle, the level of the external data transfer control signal ECNT is changed from "H" to "L" and the level of the internal data transfer control signal RCNT is changed from "L" to "H".

The control of the CPU 24 through the resource priority specifying signal RPRITY may be directly performed via an external terminal or may be performed via a register.

When the read/write control signal RD/WR#="L", the CPU 24 operates so that the external data transfer control signal ECNT="L" and the internal data transfer control signal RCNT="L".

In the above-described semiconductor apparatus 20, when the CPU 24 performs the read access, the read/write control signal (output by the CPU 24) RD/WR#="H" and each of the three-state buffers 40 and 45 is in the inactive state.

In this case, when the resource priority specifying signal RPRITY="H", during the read access performed, the internal data transfer control signal RCNT="H", the external data transfer control signal ECNT="L", the three-state buffer 39 is in the active state and the three-state buffer 44 is in the inactive state.

As a result, for example, when the address ADR which indicates that read access is performed to any of the internal resources 31-1, 31-2, . . . , 31-5 is input to the internal address bus 29 from the CPU 24, the resource selecting signal generating circuit 33 selects the internal resource.

In this case, one of the resource selecting signals RS1, RS2, . . . , RS5 is at "H". Thereby, the response signal RREQ="H", and a state is maintained in which the external data transfer control signal ECNT="L", internal data transfer control signal RCNT="H", the three-state buffer 39 is in the active state and the three state buffer 44 is in the inactive state.

As a result, the data outputted from the internal resource selected by the resource selecting signal generating circuit 33 is received by the CPU 24 via the resource bus 32, three-state buffer 39 and the internal data bus 30.

However, when the CPU 24 outputs the address ADR which indicates an external resource, each of the resource selecting signals RS1, RS2, . . . , RS5 is at "L". Thereby, in the subsequent clock cycle, the level of the internal data transfer control signal RCNT is changed from "H" to "L" and the level of the external data transfer control signal ECNT is changed from "L" to "H".

As a result, the three-state buffer 39 is in the inactive state and the three-state buffer 44 is in the active state. The data output from the external resource is received by the CPU 24 via the external data bus 23, three-state buffer 44 and the internal data bus 30.

In the case where the resource priority specifying signal RPRITY="L", when the read access is performed, the internal data transfer control signal RCNT="L", and external data transfer control signal ECNT="H", thereby the three-state buffer 39 is in the inactive state and the three-state buffer 44 is in the active state.

As a result, for example, when the CPU 24 outputs the address ADR which indicates an external resource to the internal address bus 29, the data output from the external resource is received by the CPU 24 via the external data bus 23, three-state buffer 44 and internal data bus 30.

However, when the CPU 24 outputs the address ADR which indicates any of the internal resources 31-1, 31-2, . . . , 31-5 to the internal address bus 29, the resource selecting signal generating circuit 33 selects the internal resource.

In this case, one of the resource selecting signals RS1, RS2, ..., RS5 is at "H". Thereby, the response signal RREQ="H", and, in the subsequent clock cycle, the level of the internal data transfer control signal RCNT is changed from "L" to "H" and the level of the external data transfer control signal ECNT is changed from the "H" to "L".

As a result, the three-state buffer 39 is in the active state and the three-state buffer 44 is in the inactive state. The data output from the internal resource selected by the resource selecting signal generating circuit 33 is received by the CPU 24 via the resource bus 32, three-state buffer 39 and internal data bus 30.

When the CPU 24 performs the write access, the read/write control signal RD/WR#="L" and thereby, each of the three-state buffers 40 and 45 is in the active state. Further, the external data transfer control signal ECNT="L" and the internal data transfer control signal RCNT="L". Thereby, each of the three-state buffers 39 and 44 is in the inactive state.

Figure 3A:
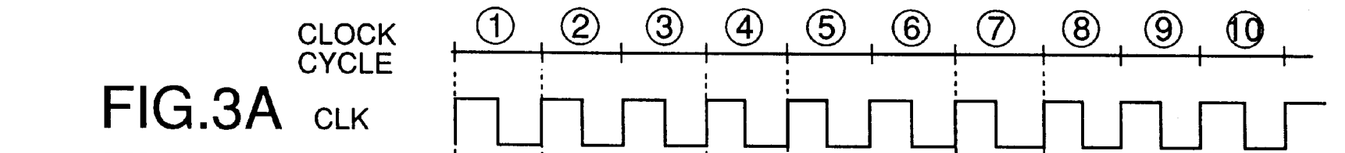
FIGS. 3A, 3B, 3C, 3D, 3E and 3F show a time chart showing an example of operations of the semiconductor apparatus shown in FIG. 2.
Figure 3B:
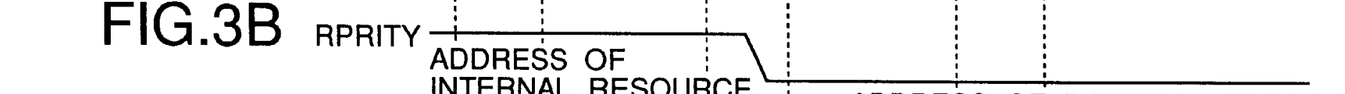
Figure 3C:
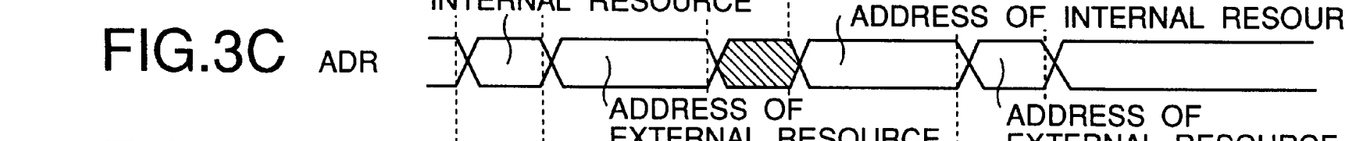
Figure 3D:
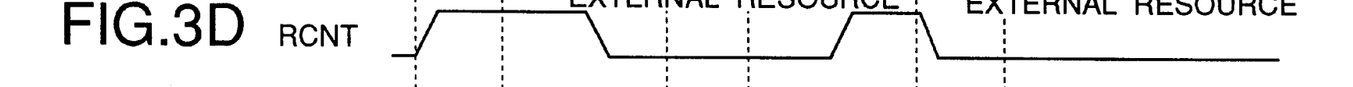
Figures 3E, 3F:
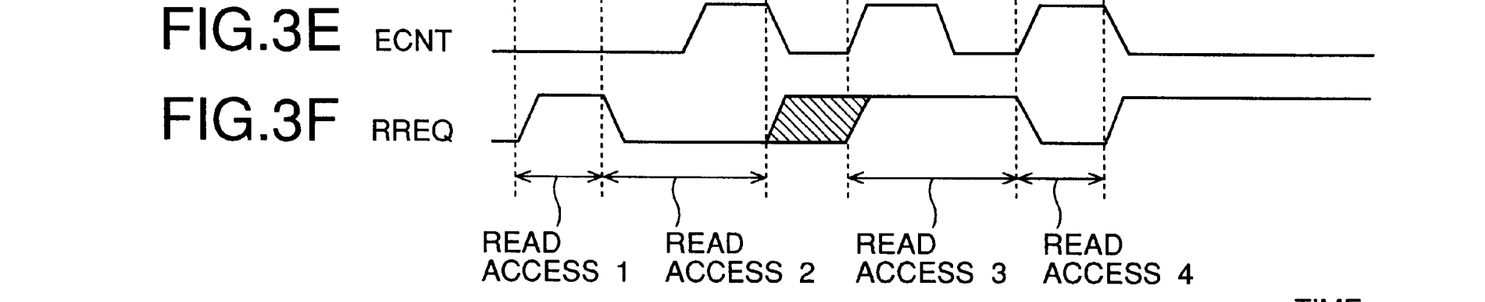

FIG. 3A, 3B, 3C, 3D, 3E and 3F show a time chart showing an example of operations of the semiconductor apparatus 20. FIG. 3A shows the clock pulses, FIG. 3B shows the resource priority specifying signal RPRITY, FIG. 3C shows the address ADR, FIG. 3D shows the internal data transfer control signal RCNT, FIG. 3E shows the external data transfer control signal ECNT and FIG. 3F shows the response signal RREQ.

In the example shown in FIGS. 3A–3F, when the resource priority specifying signal RPRITY="H", read access to an internal resource and read access to an external resource are performed in the stated order. Then, the resource priority specifying signal RPRITY="H", and read access to an internal resource and read access to an external resource are performed in the stated order.

In the first clock cycle, when the read access to the internal resource (read access 1) is started, because the resource priority specifying signal RPRITY="H", the internal data transfer control signal RCNT="H" and the external data transfer control signal ECNT="L". Thereby, the three-state buffer 39 is in the active state and the three-state buffer 44 is in the inactive state.

In this case, the resource selecting signal generating circuit 33 selects the internal resource. Thereby, the response signal RREQ="H", the internal data transfer control signal RCNT="H" and the external data transfer control signal ECNT="L".

As a result, the state where the three-state buffer 39 is in the active state and the three-state buffer 44 is in the inactive state is maintained. The data from the selected internal resource is received by the CPU 24 via the resource bus 32, three-state buffer 39 and internal data bus 30.

Then, in the second clock cycle, when the CPU 24 starts the read access to the external resource (read access 2), because the resource priority specifying signal RPRITY="H", the state is maintained in which the internal data transfer control signal RCNT="H" and the external data transfer control signal ECNT="L".

However, because the CPU 24 performs the external resource, each of the resource selecting signals RS1, RS2, ..., RS5 of the resource selecting signal generating circuit 33 is at "L". Thereby, the response signal RREQ="L".

As a result, in the third clock cycle, the internal data transfer control signal RCNT="L" and the external data transfer control signal ECNT="H". Thereby, the three-state buffer 39 is in the inactive state and the three-state buffer 44 is in the active state.

As a result, the data output from the external resource is received by the CPU 24 via the external data bus 23, three-state buffer 44 and internal data bus 30.

Then, in the fourth clock cycle, the level of the resource priority specifying signal is caused to be "L", and, in the fifth clock cycle, the read access to the internal resource (read access 3) is started. Then, because the resource priority specifying signal RPRITY is at "L", the internal data transfer control signal RCNT="L", the external data transfer control signal ECNT="H", the three-state buffer 39 is in the inactive state and the three-state buffer 44 is in the active state.

In this case, one of the resource selecting signals RS1–RS5 of the resource selecting signal generating circuit 33 is at "H". Thereby, the response signal RREQ="H", and, in the sixth clock cycle, the internal data transfer control signal RCNT="H", the external data transfer control signal ECNT="L", the three-state buffer 39 is in the active state and the three-state buffer 44 is in the inactive state.

As a result, the data from the selected internal resource is received by the CPU 24 via the resource bus 32, three-state buffer 39 and internal data bus 30.

Then, in the seventh clock cycle, the read access to the external resource (read access 4) is started. Because the resource priority specifying signal RPRITY is at "L", the internal data transfer control signal RCNT="L", the external data transfer control signal ECNT="H", the three-state buffer 39 is in the inactive state and the three-state buffer 44 is in the active state.

As a result, in this case, the data output by the external resource is received by the CPU 24 via the external data bus, three-state buffer 44 and internal data bus 30.

Thus, in the semiconductor apparatus 20, in the case where a setting is made so that the read access to the internal resources 31-1, 31-2, ..., 31-5 is given priority over read access to the external resources, when performing read access, the CPU 24 controls the three-state buffers 39 and 44 so that the three-state buffer 39 is in the active state and the three-state buffer 44 is in the inactive state.

As a result, when read access is performed, the resource bus 32 is effective and the external data bus 23 is ineffective. Thereby, when the read access is performed to any of the internal resources 31-1, 31-2, ..., 31-5, the read access to the internal resource by the CPU 24 can be performed at high speed.

In the case where setting is made so that the read access to the external resources is given priority over the read access to the internal resources 31-1, 31-2, ..., 31-5, when performing read access, the CPU 24 controls the three-state buffers 39 and 44 so that the three-state buffer 39 is in the inactive state and the three-state buffer 44 is in the active state.

As a result, when read access is performed, the resource bus 32 is ineffective and the external data bus 23 is effective. Thereby, when the read access is performed to an external resource, the read access to the external resource by the CPU 24 can be performed at high speed.

Thus, in the semiconductor apparatus 20, in the case where a setting is made so that read access to the internal resources 31-1, 31-2, ..., 31-5 is given priority over read access to the external resources, the read access to the internal resources 31-1, 31-2, ..., 31-5 by the CPU 24 can be performed at high speed. In the case where a setting is made so that read access to external resources is given priority over read access to the internal resources 31-1, 31-2, ..., 31-5, the read access to the external resources by the CPU 24 can be performed at high speed. Thereby, when the semiconductor apparatus 20 is used, high-speed operation/processing of the information processing system can be achieved.

Further, because the CPU 24 previously knows whether access is made to an external resource or internal resource (as a result of the signals PRITY and RREQ being supplied to the CPU 24) and thereby each of the external data transfer control signal ECNT and the internal data transfer control signal RCNT does not include hazards, the number of bus switching operations can be reduced. Thereby, low-power-consumption operation/processing of the information processing system can be achieved.

The term 'hazard' means a temporary level change of a signal which occurs when the signal is obtained from performing a logic operation on input signals and there is a time difference between level changes of the input signals as a result of skew of the signals. During the time difference, the output signal has a different level. Such a difference level is a hazard. In the above-described embodiment, the signals ECNT and RCNT are obtained as a result of an logical operation being performed on the signals RPRITY and RREQ and the result of the logical operation being held by a flip-flop at rising of the clock pulses CLK. Accordingly, no hazard occurs other than the time of rising of the clock pulses CLK. When a hazard is included in the signal RCNT or the signal ECNT, the connection controlled by the signal (the connection between the data bus 30 and the resource bus 32 or the connection between the data bus 30 and the external data bus 23) is in the connection state or in the disconnection state during the hazard. Thus, unnecessary switching is performed.

Further, the present invention is not limited to the above-described embodiments, and variations and modifications may be made without departing from the scope of the present invention claimed in the following claims.

What is claimed is:

1. A semiconductor apparatus comprising:
    a CPU;
    a plurality of resources to which said CPU performs read access;
    a resource selecting signal generating circuit connected to said CPU so as to generate and supply a resource selecting signal to said CPU; and
    a plurality of buffers connecting said plurality of resources to said CPU, respectively, wherein said CPU controls one of said plurality of buffers connected to one of said plurality of resources to be in an active state based on the resource selecting signal so that said CPU performs read access to said one of said plurality of resources via said one of said plurality of buffers, said one of said plurality of resources being given priority by said CPU so that said one of said plurality of resources is accessed first, wherein said plurality of buffers are connected via a single bus which is connected to said CPU.

2. A semiconductor apparatus comprising:
    a CPU;
    an internal resource;
    a resource selecting signal generating circuit connected to said CPU so as to generate and supply a resource selecting signal to said CPU;
    first data transfer control means provided in a data transfer path between said CPU and said internal resource for controlling data transfer from said internal resource to said CPU; and
    second data transfer control means provided in a data transfer path between said CPU and an external resource for controlling data transfer from said external resource to said CPU, wherein:
        when a setting is made so that read access to said internal resource is given priority over read access to said external resource, during read access, said CPU controls said first and second data transfer control means based on the resource selecting signal so that said first data transfer control means is in an active state and said second data transfer control means is in an inactive state, and, when said read access is not to said internal resource, said CPU controls said first and second data transfer control means so that, in a subsequent operation cycle, said first data transfer control means is in the inactive state and said second data transfer control means is in the active state; and
        when a setting is made so that read access to said external resource is given priority over read access to said internal resource, during read access, said CPU controls said first and second data transfer control means based on the resource selecting signal so that said first data transfer control means is in the inactive state and said second data transfer control means is in the active state, and, when said read access is to said internal resource, said CPU controls said first and second data transfer control means so that, in a subsequent operation cycle, said first data transfer control means is in the active state and said second data transfer control means is in the inactive state.

3. The semiconductor apparatus according to claim 2, further comprising a response signal generating circuit which determines whether an address output from said CPU indicates said internal resource, and supplies a response signal to said CPU, said response signal indicating whether the address output from said CPU indicates said internal resource, so that said CPU, based on said response signal, can know whether said read access is to said internal resource.

4. The semiconductor apparatus according to claim 2, wherein the setting of whether read access to said internal resource is given priority over read access to said external resource or read access to said external resource is given priority over read access to said internal resource is made directly to said CPU via an external terminal.

5. The semiconductor apparatus according to claim 2, wherein the setting of whether read access to said internal resource is given priority over read access to said external resource or read access to said external resource is given priority over read access to said internal resource is made through a register to said CPU.

6. A method of providing read access to a plurality of resources by a CPU, wherein a plurality of buffers connect said plurality of resources to said CPU, respectively, comprising:
    controlling one of said plurality of buffers connected to one of said plurality of resources to be in an active state based on a resource selecting signal provided by a resource selecting signal generating circuit so that said CPU performs read access to said one of said plurality of resources via said one of said plurality of buffers, said one of said plurality of resources being given priority by said CPU so that said one of said plurality of resources is accessed first, wherein said plurality of buffers are connected via a single bus which is connected to the CPU.

7. A method of read access to an internal resource and an external resource by a CPU in a semiconductor apparatus which includes said CPU and said internal resource and said external resource connected thereto, comprising the steps of:

a) when read access to said internal resource is given priority over read access to said external resource, during read access performed by said CPU, controlling a data transfer path between said internal resource and said CPU to be conductive and a data transfer path between said external resource and said CPU to be non-conductive and a data transfer path between said external resource and said CPU to be non-conductive based on a resource selecting signal supplied to said CPU, and, when said read access by said CPU is not to said internal resource, controlling said data transfer path between said internal resource and said CPU to be non-conductive and said data transfer path between said external resource and said CPU to be conductive in a subsequent operation cycle based on the resource selecting signal supplied to said CPU; and b) when read access to said external resource is given priority over read access to said internal resource, during read access performed by said CPU, controlling said data transfer path between said internal resource and said CPU to be non-conductive and said data transfer path between said external resource and said CPU to be conductive based on the resource selecting signal supplied to said CPU, and, when said read access by said CPU is to said internal resource, controlling said data transfer path between said internal resource and said CPU to be conductive and said data transfer path between said external resource and said CPU to be non-conductive in a subsequent operation cycle based on the resource selecting signal supplied to said CPU.

8. A semiconductor apparatus having a processing unit performing read/write operations to and from a plurality of resources, comprising:

a plurality of buffers connecting said plurality of resources to the processing unit, wherein the processing unit controls one of said plurality of buffers connected to one of the plurality of resources to be in an active state based on a resource selecting signal provided by a resource selecting signal generating circuit so that the processing unit accesses one of the plurality of resources via said one of said plurality of buffers, said one of the plurality of resources being given a priority by the processing unit so that said one of the plurality of resources is accessed first, wherein said plurality of buffers are connected via a single bus which is connected to the processing unit.

\* \* \* \* \*